United States Patent
Kataoka et al.

(10) Patent No.: US 7,938,440 B2
(45) Date of Patent: May 10, 2011

(54) AIRBAG APPARATUS AND METHODS

(75) Inventors: Tadahito Kataoka, Atsugi (JP); Takuji Kawasaki, Ebina (JP); Yoshinori Maeda, Isehara (JP)

(73) Assignee: Nissan Motor Co., Ltd., Kanagawa (JP)

( * ) Notice: Subject to any disclaimer, the term of this patent is extended or adjusted under 35 U.S.C. 154(b) by 138 days.

(21) Appl. No.: 12/339,830

(22) Filed: Dec. 19, 2008

(65) Prior Publication Data
US 2009/0160166 A1 Jun. 25, 2009

(30) Foreign Application Priority Data
Dec. 20, 2007 (JP) ................................. 2007-328616

(51) Int. Cl.
*B60R 21/21* (2006.01)
*B60R 21/233* (2006.01)

(52) U.S. Cl. ...................... 280/730.2; 280/729; 280/740
(58) Field of Classification Search ............... 280/730.2, 280/729, 740, 739, 743.1
See application file for complete search history.

(56) References Cited

U.S. PATENT DOCUMENTS

| 5,718,450 | A * | 2/1998 | Hurford et al. ............. 280/730.2 |
| 5,765,863 | A * | 6/1998 | Storey et al. ................. 280/729 |
| 5,913,536 | A * | 6/1999 | Brown ......................... 280/730.2 |
| 6,206,411 | B1 * | 3/2001 | Sunabashiri ............... 280/730.2 |
| 6,270,113 | B1 * | 8/2001 | Wipasuramonton et al. ........................... 280/730.2 |
| 6,371,518 | B1 * | 4/2002 | Kalandek et al. .......... 280/743.1 |
| 6,561,539 | B1 * | 5/2003 | Sunabashiri et al. ....... 280/730.1 |
| 6,827,368 | B2 * | 12/2004 | Jang et al. ...................... 280/729 |
| 6,976,702 | B2 * | 12/2005 | Yokota et al. .............. 280/730.2 |
| 2003/0034638 | A1 * | 2/2003 | Yoshida ........................ 280/729 |
| 2004/0119269 | A1 | 6/2004 | Yokota et al. |
| 2005/0057024 | A1 * | 3/2005 | Weston et al. ............. 280/730.2 |
| 2007/0046000 | A1 * | 3/2007 | Sato et al. .................. 280/730.2 |
| 2008/0100045 | A1 * | 5/2008 | Fukawatase et al. ...... 280/730.2 |

FOREIGN PATENT DOCUMENTS

| JP | 2004210012 | | 7/2004 |
| JP | 2006-297308 A | | 11/2006 |
| JP | 2007-62599 | * | 3/2007 |
| JP | 2007062599 | | 3/2007 |

OTHER PUBLICATIONS

Office Action in Japanese Patent Application No. 2007-328616, dated Apr. 20, 2010 (3 pages).
English Patent Abstract of JP2006297308 from esp@cenet, published Nov. 2, 2006 (1 page).

(Continued)

*Primary Examiner* — Toan C To
*Assistant Examiner* — George D. Spisich
(74) *Attorney, Agent, or Firm* — Osha • Liang LLP

(57) ABSTRACT

An airbag apparatus of a vehicle includes a curtain airbag configured to be deployed from a first location proximate to an upper portion of a side window of the vehicle, the curtain airbag configured to extend to a lower portion of the side window when the curtain airbag is inflated, and a side airbag configured to be deployed from a second location proximate to the lower portion of the side window, wherein the side airbag is arranged to suppress a movement of the curtain airbag when the curtain airbag and the side airbag are inflated.

16 Claims, 12 Drawing Sheets

OTHER PUBLICATIONS

English Patent Abstract of JP2004210012 from esp@cenet, published Jul. 29, 2004 (1 page).
Office Action in Korean Patent Application No. 10-2008-0125630, dated Oct. 26, 2010, (4 pages).
Espacenet Patent Abstract in Japan Publication No. 2007062599, Publication date Mar. 15, 2007, (1 page).
Office Action in Chinese Patent Application No. 200810186444.3, dated Dec. 6, 2010, (4 pages).

* cited by examiner

AIRBAG APPARATUS AND METHODS

CROSS-REFERENCE TO RELATED APPLICATIONS

The present application claims priority from Japanese Patent Application No. 2007-328616, filed Dec. 20, 2007, the contents of which are hereby incorporated by reference in their entirety.

BACKGROUND OF THE DISCLOSURE

1. Field of the Disclosure

The present disclosure relates to an airbag apparatus.

2. Description of the Related Art

Japanese Laid-Open Patent Publication No. 2004-210012 discloses an apparatus wherein a curtain airbag is inflated and deployed from an upper side of a side window area towards a lower side thereof. By doing so, the curtain airbag is disposed between a head portion of a passenger and the side window area (see "Patent Document 1").

However, when the side window area is opened or broken due to a vehicle collision, the curtain airbag cannot be supported by the side window area. Accordingly, it becomes difficult to locate the curtain airbag in a desirable position.

SUMMARY OF THE CLAIMED SUBJECT MATTER

In one aspect, the present disclosure relates to an airbag apparatus of a vehicle including a curtain airbag configured to be deployed from a first location proximate to an upper portion of a side window of the vehicle, the curtain airbag configured to extend to a lower portion of the side window when the curtain airbag is inflated, and a side airbag configured to be deployed from a second location proximate to the lower portion of the side window, wherein the side airbag is arranged to suppress a movement of the curtain airbag when the curtain airbag and the side airbag are inflated.

In another aspect, the present disclosure relates to a method to construct an airbag assembly of a vehicle including providing a curtain airbag to an upper portion of a side of the vehicle, providing a side airbag to a lower portion of a side of the vehicle, and arranging the side airbag such that an upper portion of the side airbag suppress movement of the curtain airbag towards an outer side of the vehicle when the side and the curtain airbags are inflated.

In another aspect, the present disclosure relates to an airbag apparatus of a vehicle including a curtain airbag configured to be deployed from a first location proximate to an upper portion of a side window of the vehicle, the curtain airbag configured to extend to a lower portion of the side window when the curtain airbag is inflated, and a side airbag configured to be deployed from a second location proximate to the lower portion of the side window, wherein the side airbag comprises a means for suppressing movement of the curtain airbag when the curtain airbag and the side airbag are inflated.

BRIEF DESCRIPTION OF DRAWINGS

Features of the present disclosure will become more apparent from the following description in conjunction with the accompanying drawings.

DETAILED DESCRIPTION

Hereinafter, an embodiment of the present disclosure will be explained in detail with reference to the drawings.

Figure 1:
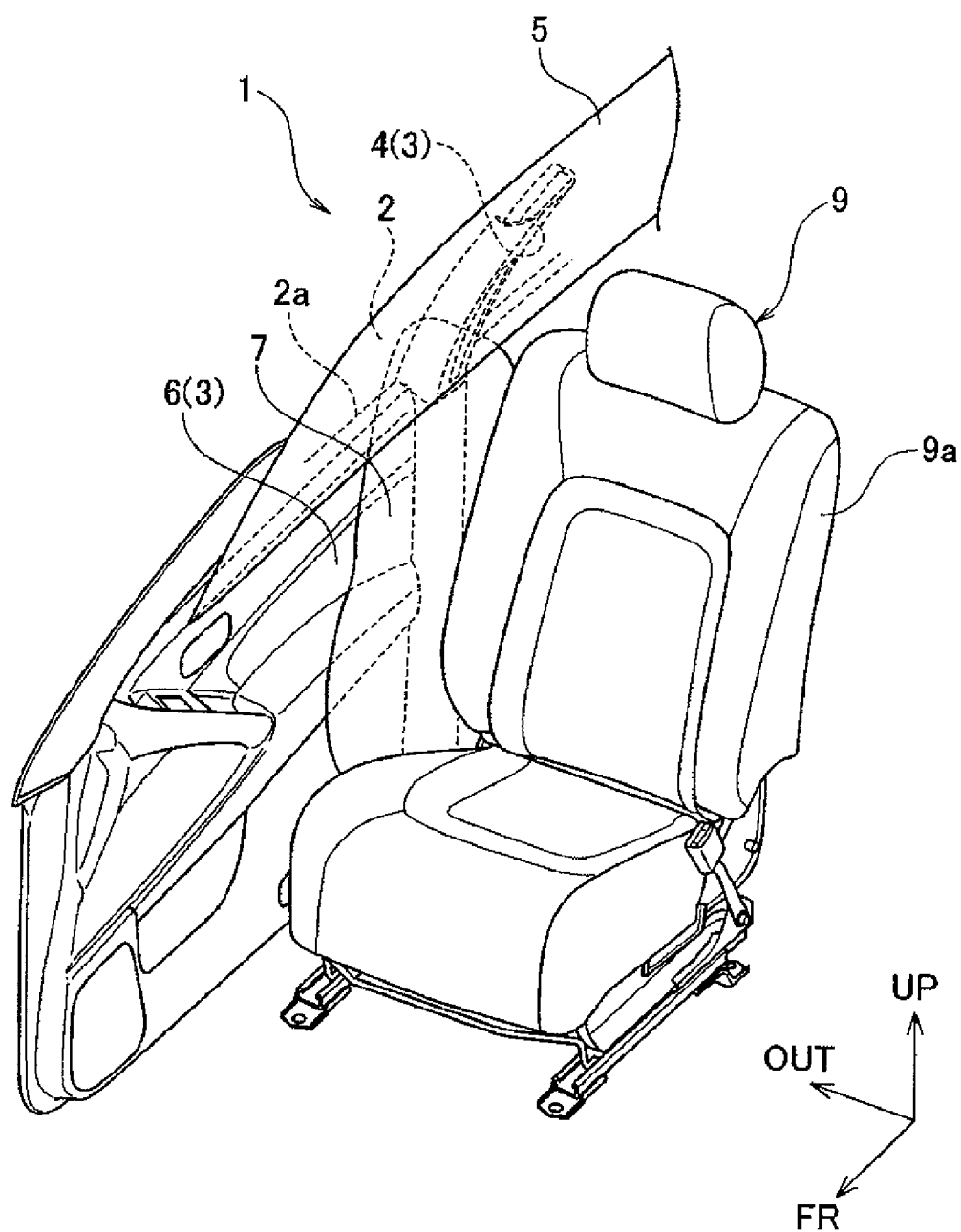
FIG. 1 is a perspective view of an interior of a compartment of a vehicle provided with an airbag apparatus in accordance embodiments of the present disclosure shown with an airbag of the airbag apparatus inflated and deployed.
Figure 2:
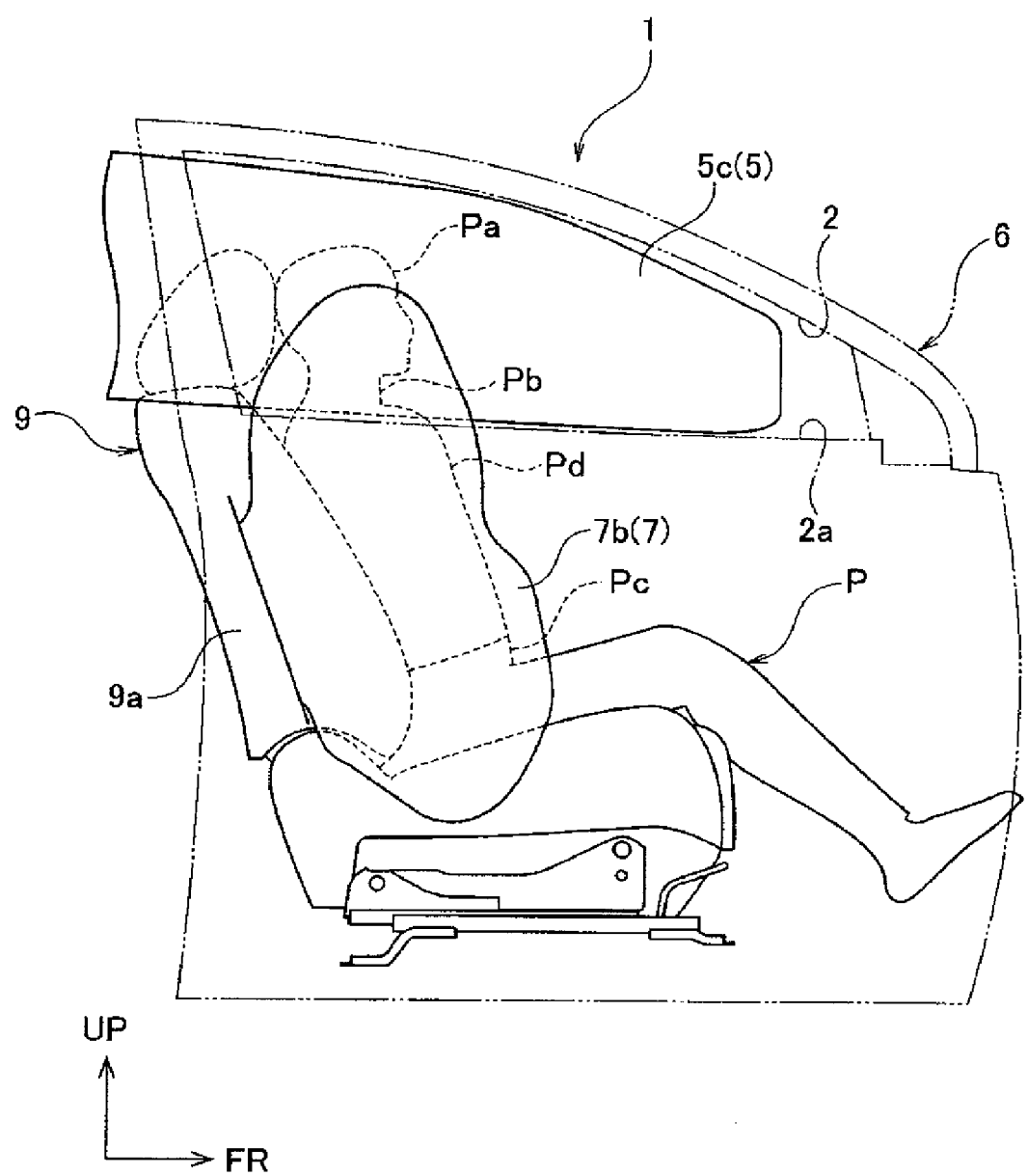
FIG. 2 is a schematic side view of a vehicle provided with the airbag apparatus of FIG. 1.

FIGS. 1 to 12 illustrate an embodiment of the present disclosure. FIG. 1 is a perspective view of an interior of a compartment of a vehicle provided with an airbag apparatus when an airbag is inflated and deployed. FIG. 2 is a schematic side view of the vehicle provided with the airbag apparatus when the airbag is inflated and deployed. Further, in each Figure, "UP" indicates an upper side, "FR" indicates a front side and "OUT" indicates an outer side in the vehicular width direction.

As shown in FIGS. 1 and 2, an airbag apparatus 1 may include a curtain airbag 5 and a side airbag 7. The curtain airbag 5 may be inflated and deployed from a location proximate to an upper side of a side window area 2 along a pillar 4 or a side window area 2 towards a lower side. The side airbag 7 may be deployed from a location proximate to a lower side of the side window area 2 along an inner surface of the pillar 4 or a door 6. The pillar 4, the side window area 2 and the door 6 may generally form the vehicle compartment side surface 3.

First, curtain airbag 5 will be explained with reference to FIGS. 3 and 4. When curtain airbag 5 is inflated and deployed, the curtain airbag 5 may downwardly extend from a roof side rail 8 or a front side pillar 8A (see FIG. 3) in a curtain configuration to form a planar cushion in a band or "curtain" shape, which may be thin and relatively long in a front-and-rear direction, generally along an upper portion of the vehicle compartment side surface 3, thereby mainly protecting a head portion Pa or a neck portion Pb of a passenger P as shown in FIG. 2. Here, the vehicle compartment side surface 3 may indicate a side surface at an inner side of the vehicle compartment formed by the side window area 2, the pillar 4 and the door 6.

In contrast, when the side airbag 7 is inflated and deployed, the side airbag 7 may form a generally planar cushion in a generally elliptical shape, which may be lengthened in an up-and-down direction, along the vehicle compartment side surface 3 about approximately a center portion. This location and shape may protect a waist portion (e.g., a belly portion) Pc and a chest portion Pd in addition to neck portion Pb of passenger P as seen in FIG. 2.

When both the curtain airbag 5 and the side airbag 7 are inflated and deployed, they may be configured to be disposed between the passenger P sitting on a seat and the vehicle compartment side surface 3. Further, it may be established in a region where the curtain airbag 5 overlaps with the side airbag 7, the side airbag 7 may be positioned at a vehicular outer side compared to the curtain airbag 5.

Figure 3:
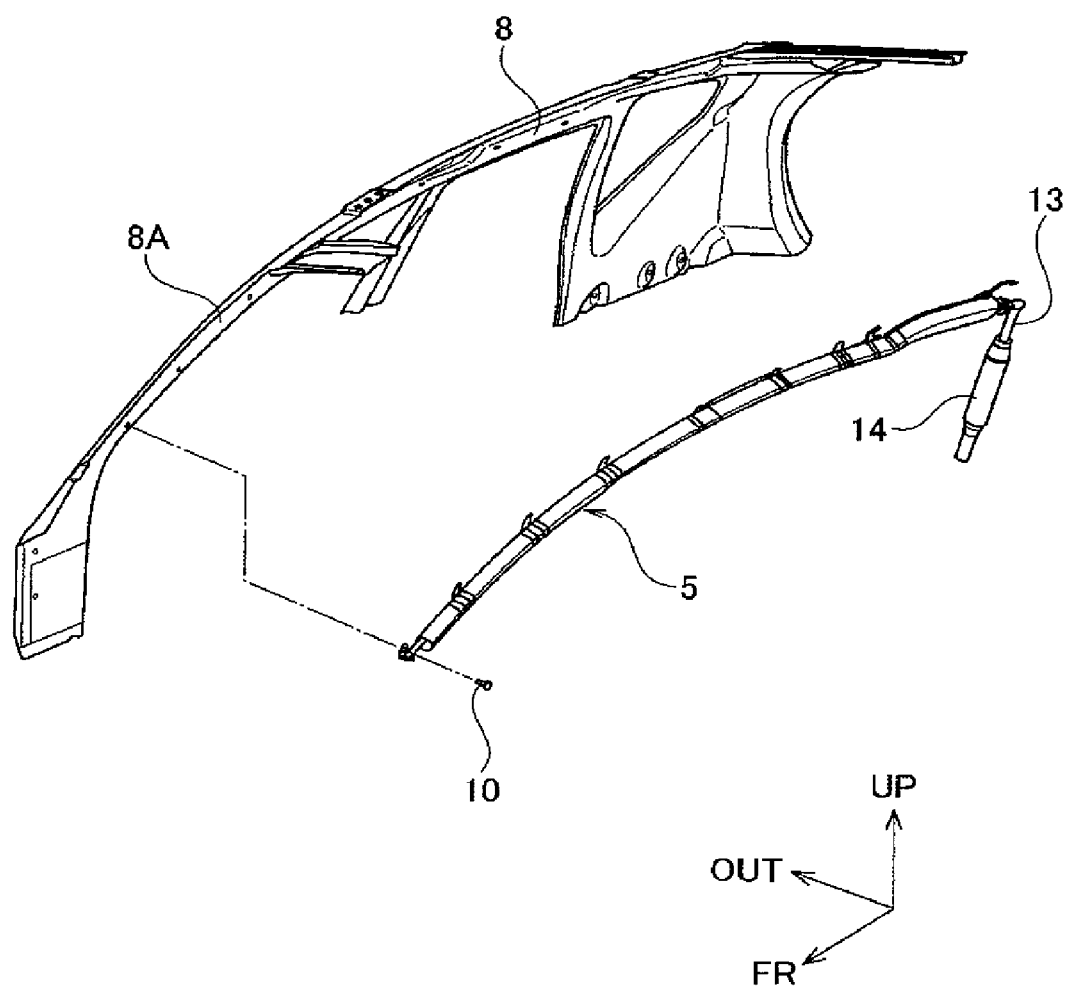
FIG. 3 is an exploded perspective view of a vehicle body side and a curtain airbag of an airbag apparatus in accordance with embodiments of the present disclosure.
Figure 4:
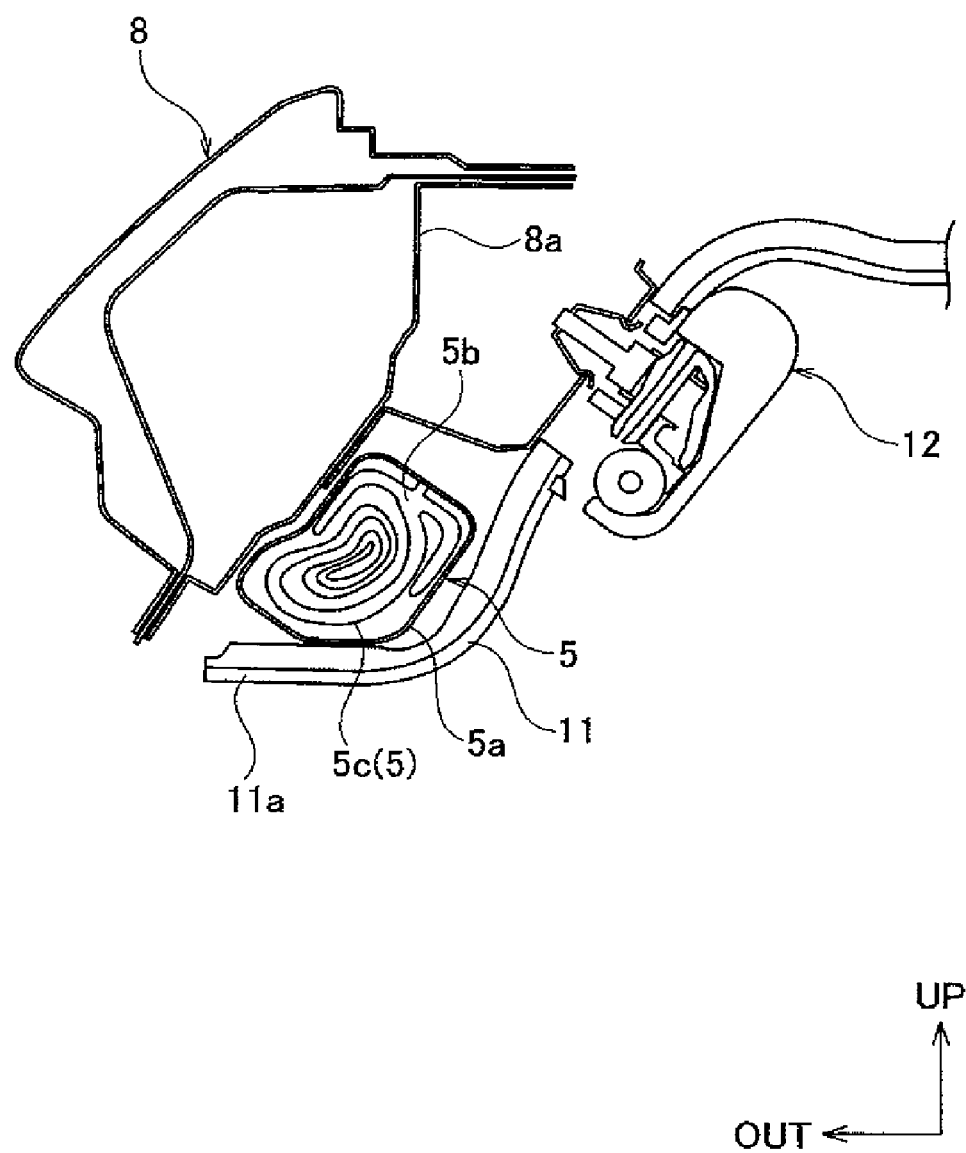
FIG. 4 is a longitudinal cross-sectional view of the vehicle body side of FIG. 3 shown with the curtain airbag of the airbag apparatus installed.

FIG. 3 is an exploded perspective view when the curtain airbag is installed. FIG. 4 is a longitudinal cross-sectional view (perpendicular in the front-and-rear direction of the vehicle) when the curtain airbag is installed. In the installed state, the curtain airbag 5 may be rolled or folded into a relatively thin and long band and covered with a cover 5a. The curtain airbag 5 may be installed from a vehicular inner side in the roof side rail 8 or the front side pillar 8A using a fastening mechanism 10 such as a screw. The vehicular inner side of the curtain airbag 5 may be covered with a trim panel 11. Additionally, reference numeral 12 of FIG. 4 indicates an assist grip.

As shown, an inflator 14 may be connected to a rear end of the curtain airbag 5 via a tube 13. The gas generated within the inflator 14 may be supplied via the tube 13 into the curtain airbag 5 and may forwardly flow within an air supply passage 5b, thereby inflating and deploying a pouch 5c, which may be rolled along an entire path in a front-and-rear direction. The air supply passage 5b may be elongated within the curtain airbag 5 in the front-and-rear direction. The pouch 5c supplied with the gas may penetrate through the cover 51 to contact and press a distal end portion 11a of the trim 11, causing the distal end portion to be bent towards the vehicular inner side. Accordingly, the pouch 5c may be deployed toward a lower side of the window area while also spanning a gap between the distal end portion 11a and a vehicle body side (e.g., the roof side rail 8, etc.).

Because the pouch 5c may be rolled such that a vehicular outer side at the time of deployment becomes a diametrical inner side (rolling central axis), a force may be exerted upon a leading end of the pouch 5c towards the vehicular outer side. That is, because a rolling direction may be established as above, the pouch 5c may tend to be inflated and deployed along the vehicle compartment side surface 3.

Figure 5:
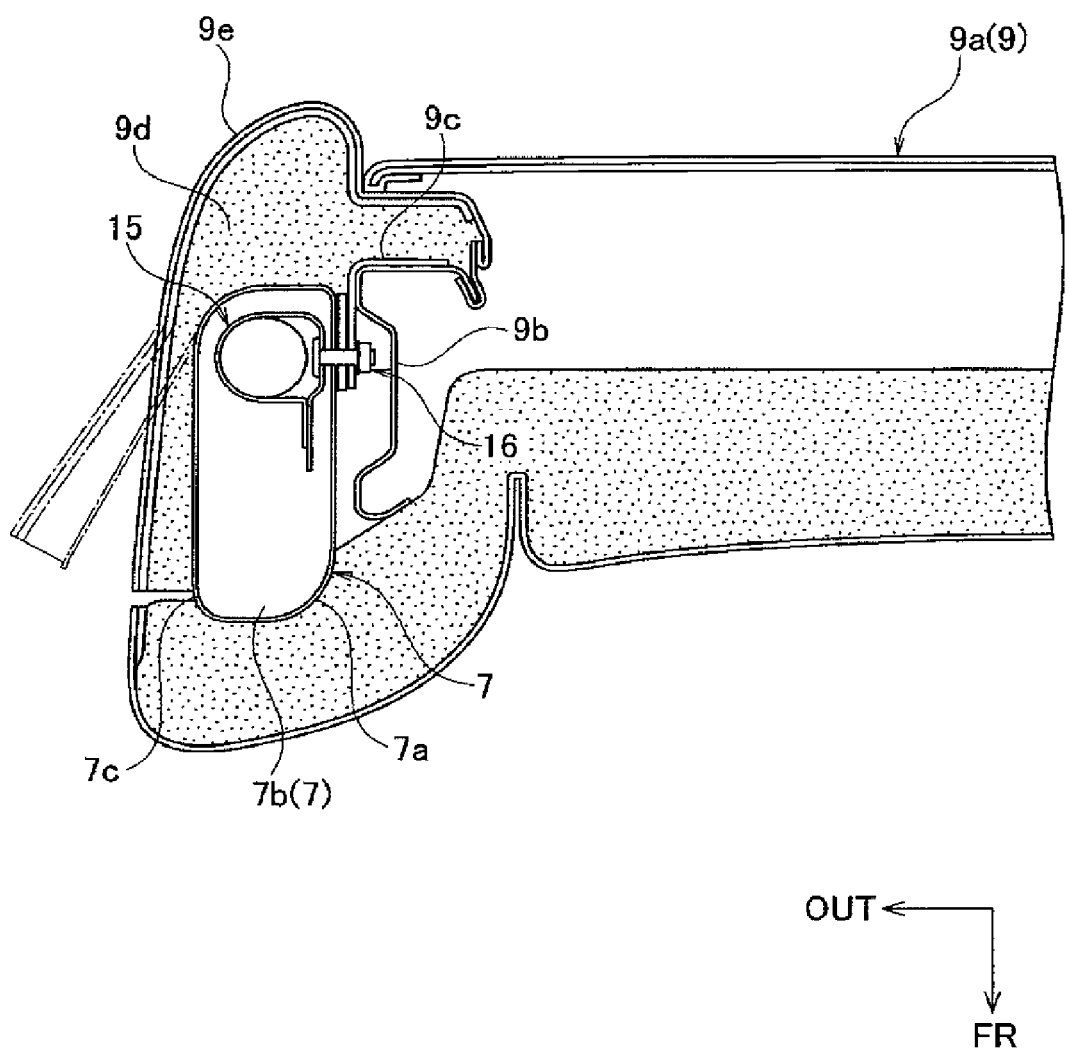
FIG. 5 is a flat cross-sectional view of a seat having a side airbag of an airbag apparatus in accordance with embodiments of the present disclosure.
Figure 6:
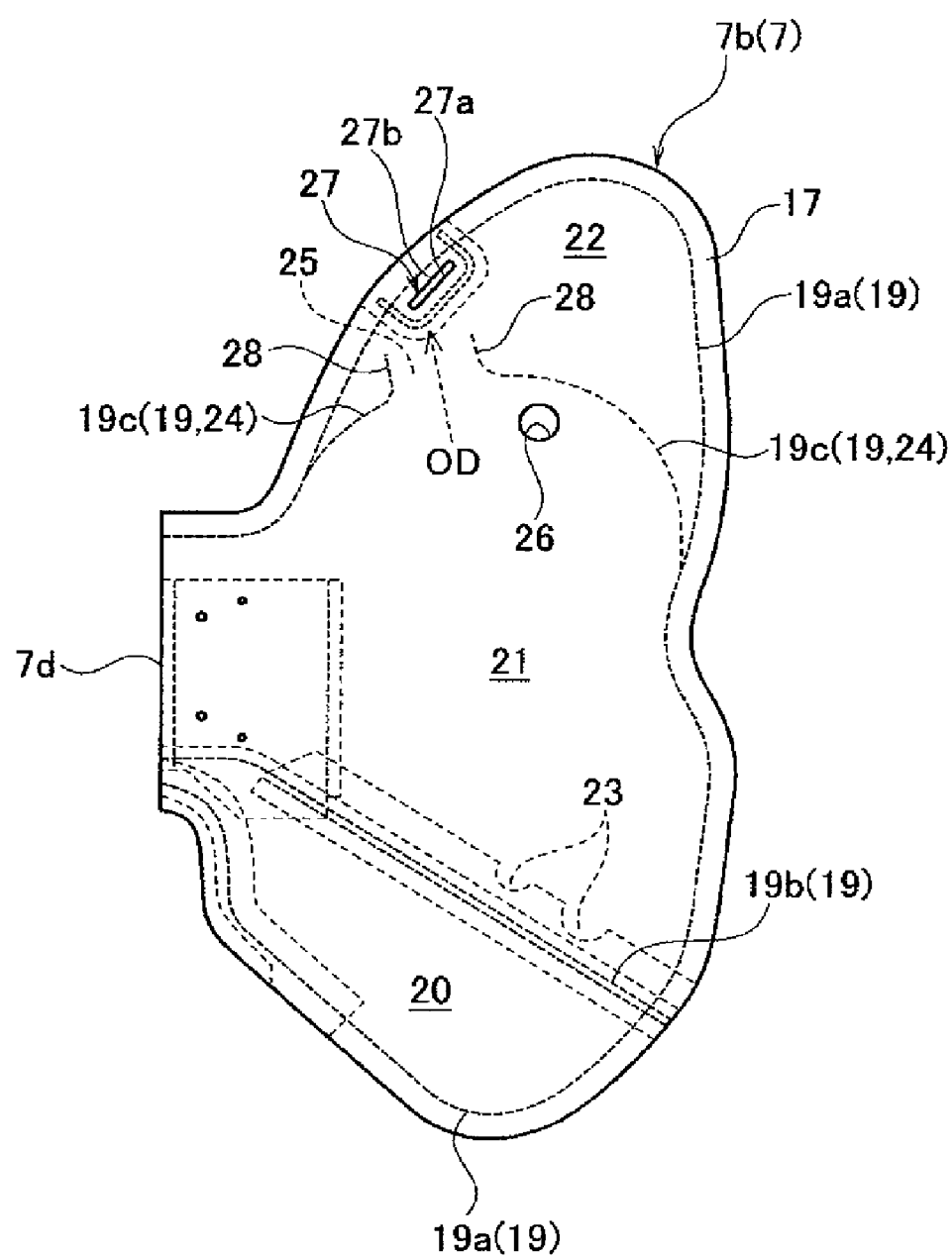
FIG. 6 is a side view of a side airbag in accordance with embodiments of the present disclosure, shown with a side airbag pouch deployed.
Figure 7:
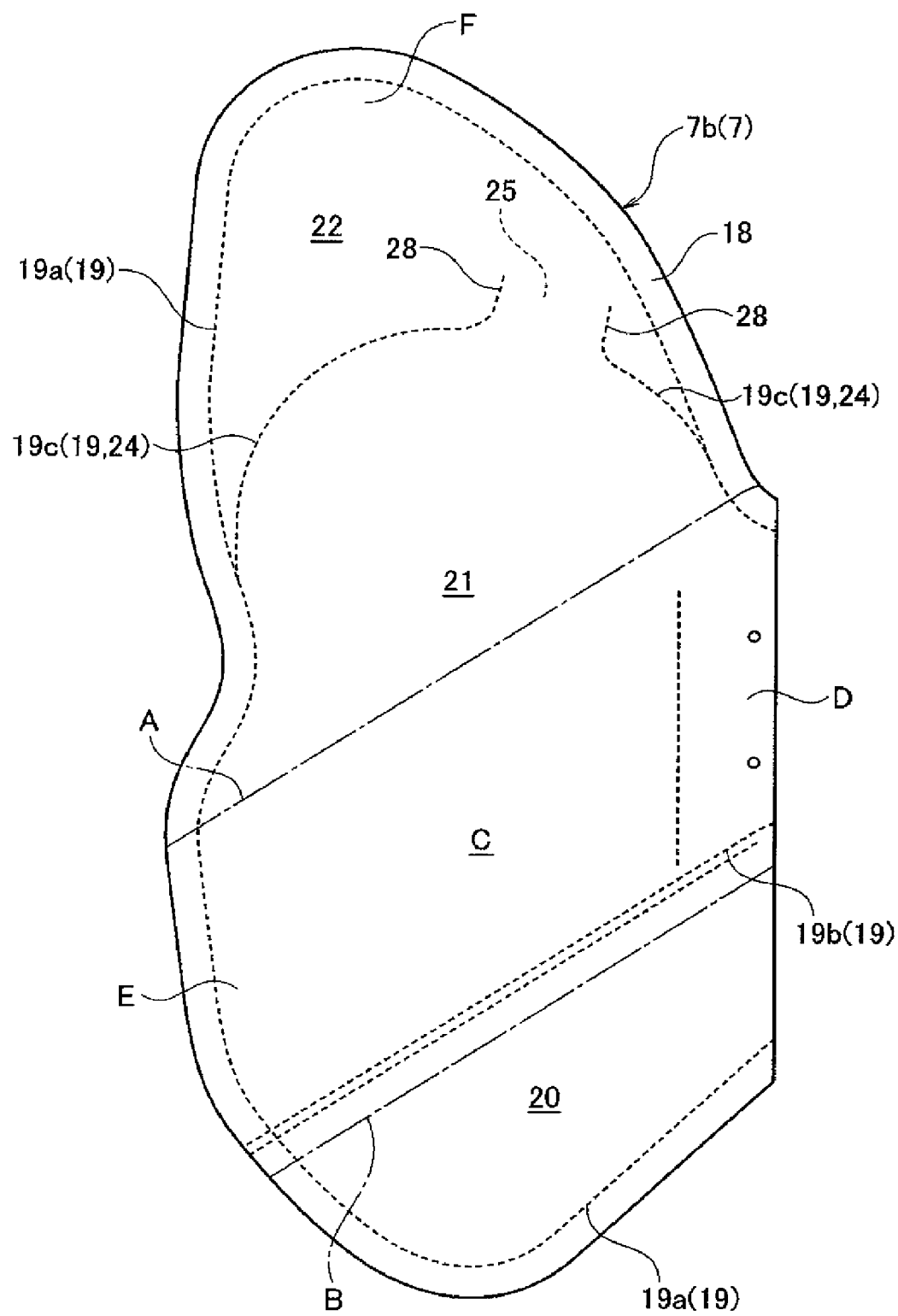
FIG. 7 is an opposite side view of the side airbag of FIG. 6.

Next, the side airbag 7 is explained with reference to FIGS. 5 to 7. FIG. 5 is a flat cross-sectional view of a seat when a side airbag pouch is installed. FIG. 6 is a side view when the side airbag pouch is deployed. FIG. 7 is a side view seen opposite from FIG. 6 when the side airbag pouch is deployed.

As shown in FIGS. 2 and 5, the side airbag 7 may be installed within a seat back 9a or a side portion of a seat back 9a of a seat 9. More specifically, as shown in FIG. 5, a pouch 7b may be folded and accommodated within a case 7a and fixed to a side frame 9b of the seat 9 via a bracket 9c by using a fastening mechanism 16 such as a bolt or nut. A periphery of the pouch 7b may be covered by a cushion layer 9d or skin 9e so as not to be seen from the outside. The pouch 7b may be supplied with the gas generated by the inflator 15 that may push the case 7a along a tear line 7c, which is previously formed and frangible, to penetrate through the case 7a. Then, the pouch 7b may expand a side portion of the seat back 9a towards the vehicular outer side in a front deployed state to be inflated and deployed toward a front direction.

As shown in FIGS. 6 and 7, the pouch 7b of the side airbag 7 may be formed by stitching two or more base cloths 17 and 18 with a stitch or seam line (i.e., a seam) 19. When the gas is supplied from the inflator 15 (not shown in FIGS. 6 and 7) to an inner portion of the pouch 7b, the pouch 7b may be inflated in a direction toward the upper end of the side window area to form a planar shape. When the pouch 7b is inflated and deployed, side airbag 7 may be oriented such that base cloth 17 shown in FIG. 6 orients toward the vehicular outer side and base cloth 18 shown in FIG. 7 orients toward the vehicular inner side. That is, base cloth 17 may correspond to a vehicular outer side base cloth and base cloth 18 may correspond to a vehicular inner side base cloth.

An entire periphery of the pouch 7b, except for an opening 7d for inserting the inflator 15 into the pouch 7b, may be stitched along a seam line 19 to form an inner space. This inner space may be divided by two stitch or seam lines 19b and 19c along the up-and-down direction (i.e., the up-and-down direction in the inflated and deployed state shown in FIGS. 6 and 7) into three portions to thereby form a first lower side compartment portion 20, a second lower side compartment portion 21 and an upper side compartment portion 22 in an orderly manner from the bottom.

Inflator 15 may have a relatively thin and long outer shape and may be disposed around opening 7d while a length direction of inflator 15 may be oriented toward the up-and-down direction. An exhaust port (not shown) of the inflator 15 may be exposed to the first lower side compartment portion 20, which may be formed at a lowermost side of the pouch 7b. The gas generated in the inflator 15 may first flow into the first lower side compartment portion 20. A communication port 23 may be formed at a boundary portion of the first lower side compartment portion 20 and the second lower side compartment portion 21. The gas may flow from an interior of the first lower side compartment portion 20 via the communication port 23 into the second lower side compartment portion 21.

The stitch or seam line 19c may be formed of a boundary portion 24 for dividing the second lower side compartment portion 21 and the upper side compartment portion 22. This stitch or seam line 19c may be interrupted in a middle portion thereof to form a communication port 25 for communicating the second lower side compartment portion 21 with the upper side compartment portion 22. The gas in the second lower side compartment portion 21 may flow via the communication port 25 into the upper side compartment portion 22.

Because the pouch 7b may not be inflated at a portion provided with the stitch or seam line 19c, the inflated pouch 7b may easily be bent at the boundary portion 24 provided with the stitch or seam line 24. That is, in select embodiments, the boundary portion 24 may form a crease in the pouch 7b (side airbag 7) along seam line 24.

Further, as shown, two exhaust ports 26 and 27 may be formed in the base cloth 17 of the vehicular outer side. The exhaust port 26, corresponding to the second lower side compartment portion 21, may exhaust the gas from the second lower side compartment portion 21 to the outside of the pouch 7b. The exhaust port 27, corresponding to the upper side compartment portion 22, may exhaust the gas from the upper side compartment portion 22 to the outside of the pouch 7b.

Thus, in select embodiments, communication port 25 may be exposed toward exhaust port 27. In FIG. 6, an opening direction of the communication port 25 may be indicated by a wave line arrow OD. Further, ends 28 of the stitch or seam lines 19c, which form the communication port 25, may be bent toward the exhaust port 27 side so as to be formed generally parallel to each other. From such a construction, when the pouch 7b is inflated, a flow path in a cylindrical shape may be formed at communication port 25 wherein the flow path may follow an elongation direction of a center line between the ends 28. Thus, it becomes possible to more precisely define an outflow direction of the gas in the communication port 25 (opening direction OD of the communication port 25).

As such, because the communication port 25 may be opened toward the exhaust port 27, the gas flowing from the second lower side compartment portion 21 via the communication port 25 to the upper side compartment portion 22 may tend to be exhausted from the exhaust port 27. In particular, in select embodiments, because the exhaust port 27 may be formed in a slit shape intersecting with the opening direction OD, an end edge 27a at an upstream side of the exhaust port 27 and an end edge 27b at a downstream side may be spaced apart from each other and thus opened so as to be sterically displaced. That is, the end edge 27a and end edge 27b may become spaced apart to allow exhaust of the gas flowing in the opening direction OD. As such, it becomes easy to secure a relatively broader region of the opening.

Further, in select embodiments, the exhaust ports 27 may be formed by a distance along the opening direction OD with respect to the communication port 25. By doing so, with respect to the gas flowing from the communication port 25, a ratio of an amount of the gas exhausted from the exhaust port 27 and an amount of the gas flowing into the upper side compartment portion 22 may be set to be properly adjustable by a size of this distance, a direction of the slit, and an area or direction of the communication port 25 (a distance between the ends 28).

Figure 8:
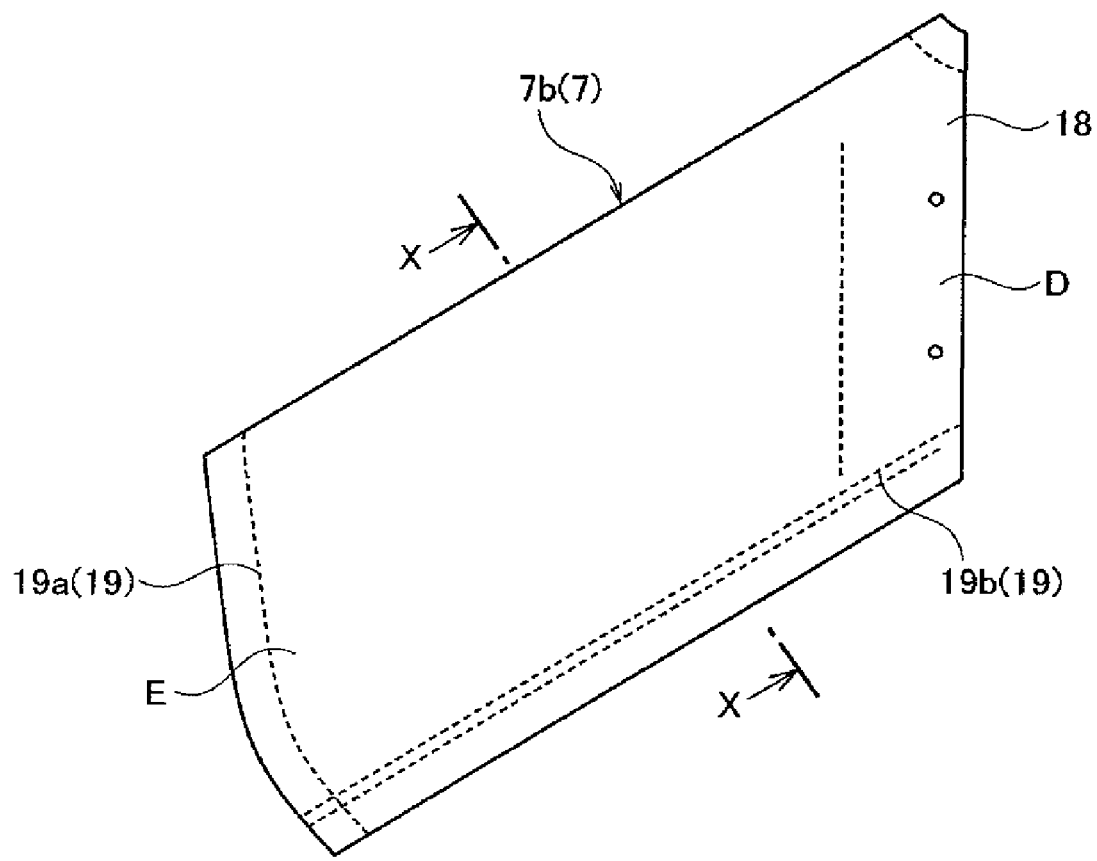
FIG. 8 illustrates an initial process of a folding order of a side airbag pouch of an airbag apparatus in accordance with embodiments of the present disclosure.
Figure 9:
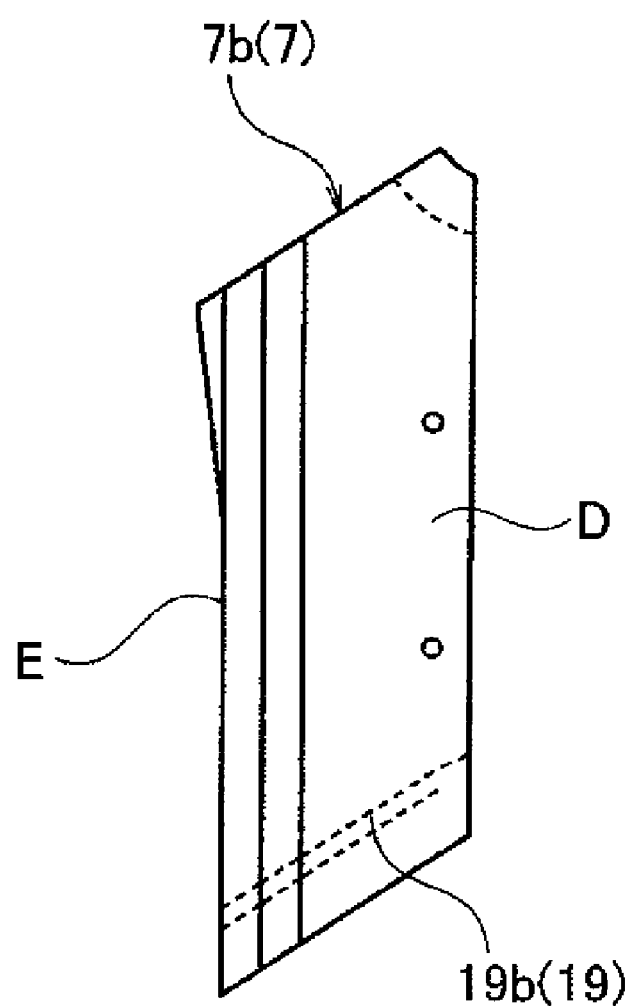
FIG. 9 illustrates a subsequent process of a folding order of a side airbag pouch of an airbag apparatus in accordance with embodiments of the present disclosure.
Figure 10:
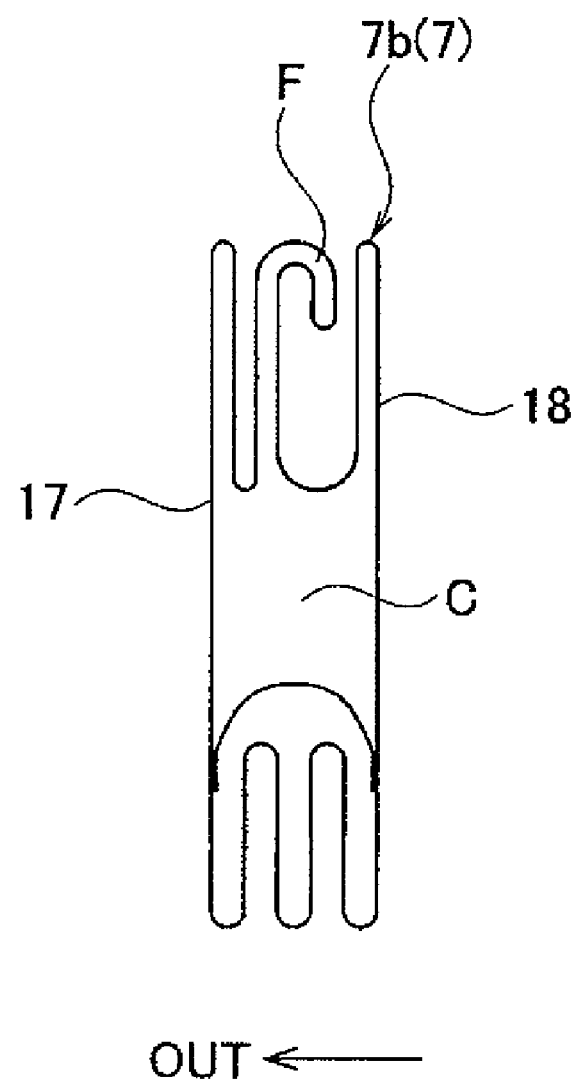
FIG. 10 is a cross-sectional view taken along a line X-X of FIG. 8.

FIGS. 8 and 9 illustrate an example of a folding order of the side airbag pouch in accordance with embodiments of the present disclosure. FIG. 10 is a cross-sectional view of FIG. 8 taken along a line X-X.

The pouch 7b of the side airbag 7 may be folded and disposed in a predetermined housing position (within the seat back 9b in the present embodiment). When folding the pouch 7b, a portion higher than dot and chain line A and a portion lower than a dot and chain line B of FIG. 7 may be folded into a center portion C to be in a state shown in FIG. 8. Then, an end E opposite to a disposing side D of the inflator 15 (not shown in FIG. 8) may be folded in a bellow shape to be in a state shown in FIG. 9 to thereby be accommodated within the case 7a (see FIG. 5).

In select embodiments, as shown in FIG. 10, an upper end F, which forms the upper side compartment portion 22 of the pouch 7b, may be accommodated within the center portion C while being bent toward the vehicle compartment inner side. By doing so, when the pouch 7b is inflated and deployed, because the upper end F (i.e., the upper portion of the pouch 7b) is unfolded toward the vehicular outer side, it is possible to more securely deploy the pouch 7b along the vehicle compartment side surface 3.

Figure 11:
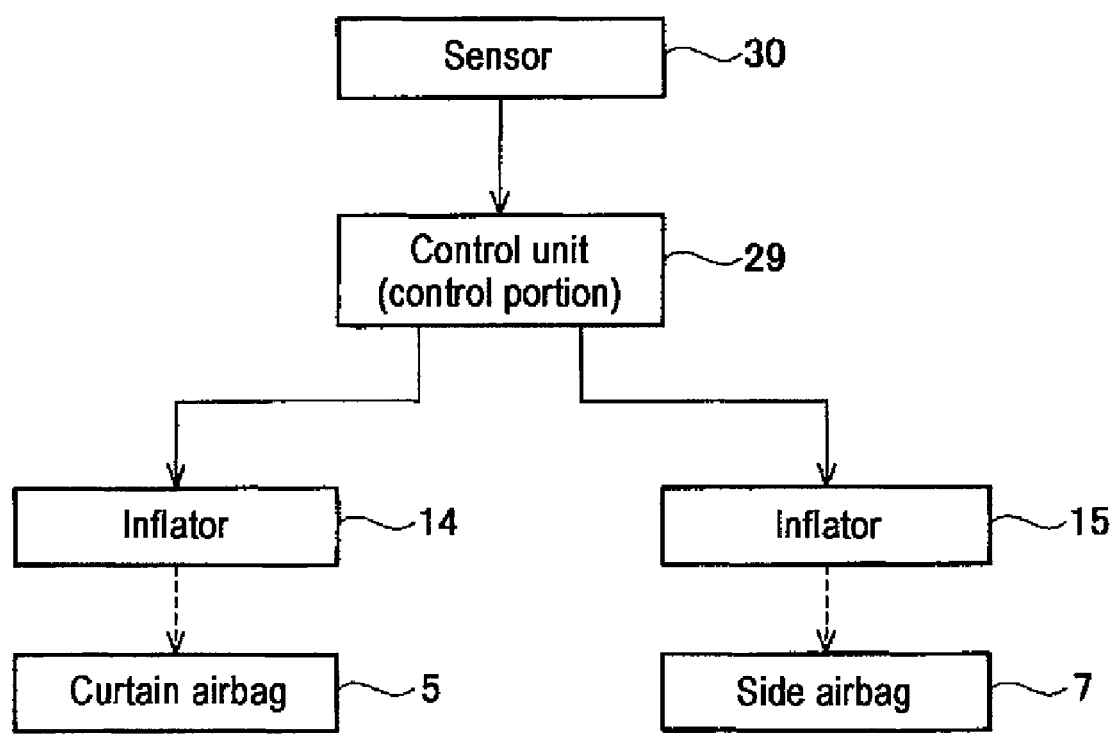
FIG. 11 is a control block diagram for an airbag apparatus in accordance with embodiments of the present disclosure.

FIG. 11 is a control block diagram of the airbag apparatus in accordance with select embodiments of the present disclosure. The airbag apparatus 1 may include a control unit (control portion) 29, a sensor 30, inflators 14 and 15, a curtain airbag 5 and a side airbag 7. When a side collision or rollover is detected by a detect signal from the sensor (e.g., an acceleration sensor) 30, because the control unit 29 controls the inflators 14 and 15 to generate the gas, the curtain airbag 5 and the side airbag 7 may be deployed. At this time, the timing to inflate and deploy curtain airbag 5 and side airbag 7 may be established to be the same or slightly different from each other.

FIGS. 12A to 12D are front views illustrating an operation of the airbag apparatus of the side collision in an order from 12A to 12D. Further, FIGS. 12A to 12D illustrate a case when the side window area 2 is either already opened at the time of the collision or broken during the collision. As such, the curtain airbag 5 and the side airbag 7 may partially move outwardly through the side window area 2 to the vehicular outer side.

In FIG. 12A, if the side collision of the vehicle with an article 31 is detected by the sensor 30 (see FIG. 11), then each of the inflators 14 and 15 may be controlled by the control unit 29 generating the gas. Then, as shown in FIG. 12B, the curtain airbag 5 and the side airbag 7 may start to inflate and deploy. In certain embodiments, it may be preferred that curtain airbag 5 and side airbag 7 start inflating and deploying at approximately the same time.

As shown in FIG. 12B, the inflated and deployed side airbag 7 may be disposed between the passenger P and vehicle compartment side surface 3. Further, the boundary portion 24 between the upper side compartment portion 22 and the second lower side compartment portion 21 of side airbag 7 (the pouch 7 thereof) may be configured to be in a position corresponding to the lower portion edge 2a of the side window area 2 while being inflated and deployed. Further, in such a state, the upper side compartment portion 22 of the side airbag 7 may not be fully inflated.

Further, if the collision proceeds as shown in FIG. 12C, because the side airbag 7 pushed by the vehicle compartment side surface 3 (door 6) approaches from a side direction to the passenger P, the chest portion Pd of the passenger P may contact side airbag 7 and press side airbag 7. At this time, as described above, because the boundary portion 24 of the second lower side compartment portion 21 and the upper side compartment portion 22 of the side airbag 7 may be in a position corresponding to the lower portion edge 2a of the side window area 2, the chest portion Pd of the passenger P may compresses the second lower side compartment portion 21 of the side airbag 7. Thus, because the gas in the second lower side compartment portion 21 flows via the communication portion 25 (see FIG. 6) into the upper side compartment portion 22, the upper side compartment portion 22 may be inflated.

Also, if the collision proceeds as shown in FIG. 12D, although the head portion Pa of the passenger P relatively approaches the vehicle compartment side surface 3, the inflated and deployed curtain airbag 5 and side airbag 7 (upper side compartment portion 22) may be disposed between a vehicular outer side and the head portion Pa. Accordingly, the head portion Pa may be protected. As can be seen from FIG. 12D, it should be understood that a portion of passenger P from the waist portion Pc to the head Pd portion of the passenger may be seamlessly protected by airbag apparatus 1 including curtain airbag 5 and side airbag 7.

Further, as shown in FIG. 12D, the inflated and deployed side airbag 7 my contact the inflated and deployed curtain airbag 5 to suppress the movement of the curtain airbag 5. The curtain airbag 5 may be inflated and deployed from the roof side rail 8 (see FIG. 3) along the inner surface of the side window area 2 as the vehicle compartment side surface 3. However, if there is no side window area 2, then the curtain airbag 5 might not be supported. This lack of support may cause the curtain airbag 5 to rotate around an upper portion support point (e.g., roof side rail 8) in the vehicular width direction. Thus, a protection of the head portion Pa may be adversely affected depending on the circumstances surrounding a collision.

According to select embodiments, the movement of the curtain airbag 5 may be suppressed by contacting an upper portion of side airbag 7 with a lower portion of curtain airbag 5. As such, because it may be easy to maintain curtain airbag 5 in a more beneficial position, the protection to the passenger P may be improved. In such a case, it may be advantageous for the lower portion of curtain airbag 5 to be retained or supported by the upper portion of side airbag 7. However, it may be advantageous for curtain airbag 5 to be disposed in a more beneficial position for protecting the head portion Pa as it approaches the vehicle compartment side surface 3. In this regard, embodiments of the present disclosure may also be characterized in that a surface of the curtain airbag 5 slidably moves along a surface of the side airbag 7 (base clothes 17 and 18) and the movement of the curtain airbag 5 is suppressed by a friction of such sliding movement.

Figure 12:
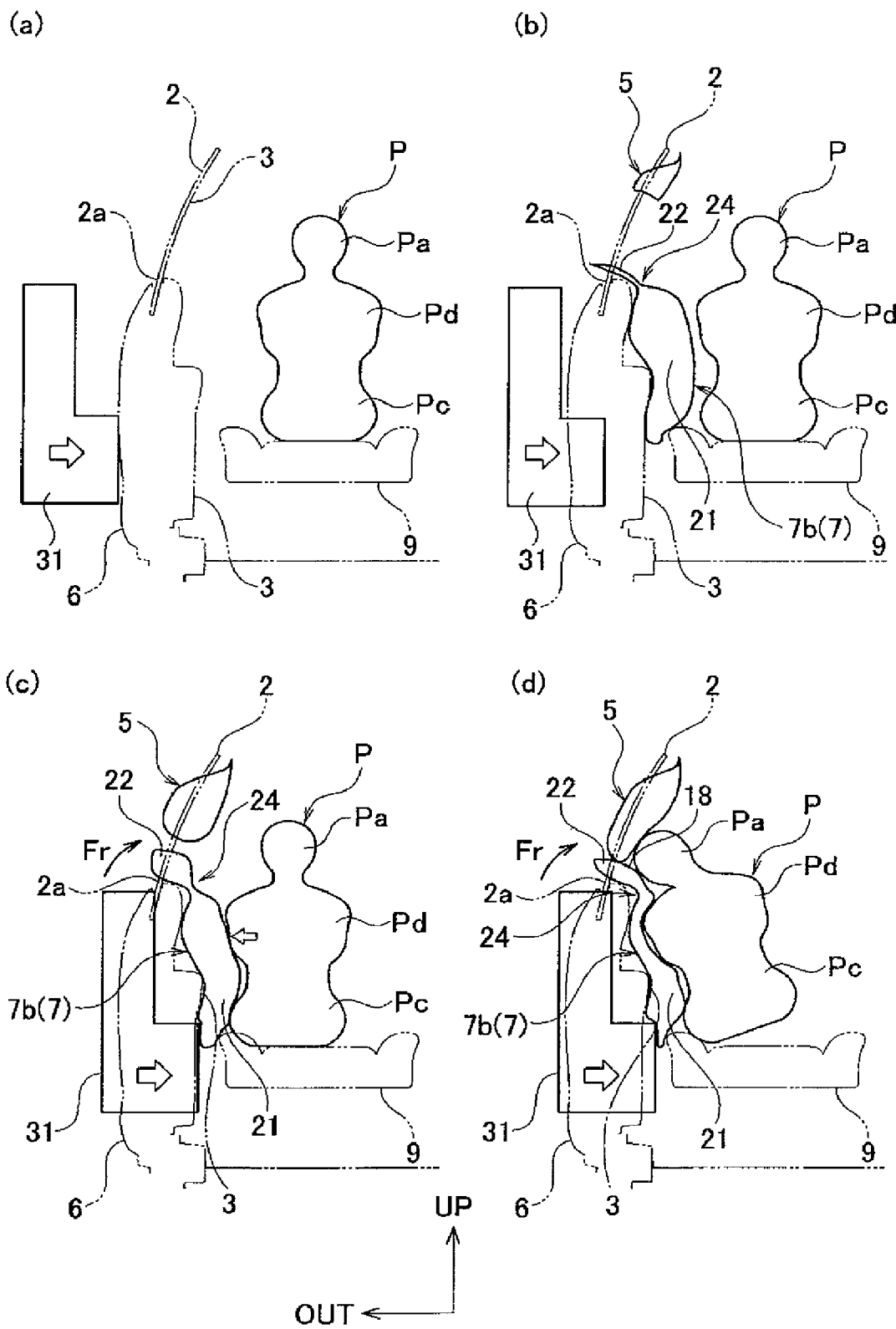
FIGS. 12A, 12B, 12C, and 12D are front views of a vehicle illustrating an operation of an airbag apparatus during a side collision in an order from (a) to (d) in accordance with embodiments of the present disclosure.

Further, as shown in FIG. 12D, the vehicular inner side base cloth 18 of the inflated and deployed side airbag 7 may contact the lower portion of the inflated and deployed curtain airbag 5. As such, the curtain airbag 5 may be suppressed from moving toward the vehicular outer side. In a collision mode as shown in FIG. 12, because the head portion Pa may move toward vehicular outer side, the protection may be improved by suppressing the movement of the curtain airbag 5 toward the vehicular outer side with side airbag 7.

Further, as described above, in select embodiments, the crease formed by the boundary portion 24 of the second lower side compartment portion 21 and the upper side compartment portion 22 of the side airbag 7 may be disposed in a position corresponding to the lower portion edge 2a of the side window area 2 so that the upper side portion may bend at the crease to cover the lower portion edge 2a. As such, as shown in FIGS. 12B and 12C, because the side airbag 7 may tend to fall with an angle towards the vehicular outer side in the opening portion of the side window area 2, it may becomes easy to obtain a state wherein the vehicular inner side base cloth 18 of the side airbag 7 contacts the lower portion of the curtain airbag 5.

Also, in select embodiments, exhaust port 27 (see FIG. 6) for exhausting the gas towards the vehicular outer side may be disposed corresponding to the upper side compartment portion 22, which may form the upper portion of the side airbag 7. Thus, a reaction force Fr of the gas exhaust may be exerted into the upper side compartment portion 22 towards the vehicular inner side. Accordingly, because the curtain airbag 5 may be pressed toward the vehicular inner side when contacting the upper portion (upper side compartment portion 22) of the side airbag 7 while the upper side compartment portion 22 is suppressed so as not to move excessively toward the vehicular outer side, the protection of the head portion Pa may be improved.

In select embodiments, the protection of the head portion Pa may be improved by curtain airbag 5. Although the head portion Pa may be protected by side airbag 7, because side airbag 7 may be deployed from the waist portion Pc along the chest portion Pd of the passenger P, compared to curtain airbag 5, side airbag 7 may tend to laterally fall down (i.e., slide downward) with respect to head portion Pa in a height of head portion Pa. Thus, it may be possible to improve the protection of the head portion Pa by using curtain airbag 5, which may be disposed adjacent to head portion Pa.

Further, to use an alternative mechanism to suppress movement of curtain airbag 5 additional components may be required, resulting in a more complicated construction or a layout that may be restrictive. However, because the movement of the curtain airbag 5 may be suppressed by effectively using the side airbag 7 to protect the waist portion Pe and the chest portion Pd of the passenger P, such construction issues are rare. As described above, because a cushion area may be formed seamlessly by airbags 5 and 7 from the waist portion Pc to the head portion Pa of the passenger P along the up-and-down direction, a much broader range of a body of the passenger P in addition to the head portion Pa may be protected.

Further, although both the curtain airbag 5 and the side airbag 7 may partially come out from the opening portion of the side window area 2, because the curtain airbag 5 and the side airbag 7 may substantially be inflated and deployed within the vehicle compartment, the resulting protection may be increased compared to a alternatives where airbags are inflated and deployed (even partially) outside the vehicle.

As described above, in select embodiments, the movement of the curtain airbag 5 may be suppressed by contacting the inflated and deployed curtain airbag 5 with the inflated and deployed side airbag 7. As a result, it may become easy to dispose the curtain airbag 5 in a more desirable position, so the protection of passenger P (particularly the head portion Pa) may be improved.

In particular, in select embodiments, the movement of the curtain airbag 5 may be suppressed by contacting the inflated and deployed curtain airbag 5 with the inflated and deployed side airbag 7. By doing so, when the head portion Pa of the passenger P moves toward the vehicular outer side at the time of a collision, because the curtain airbag 5 may be suppressed from being pushed by the head portion Pa to move toward the vehicular outer side, the protection of the head portion Pa may be improved.

Further, in select embodiments, the side airbag 7 may include the base cloths 17 and 18. The base cloth 17 may form the vehicular outer side in the inflated and deployed state. Further, the base cloth 18 may form the vehicular inner side in the inflated and deployed state. The vehicular inner side base cloth 18 of the inflated and deployed side airbag 7 may contact the lower portion of the inflated and deployed curtain airbag 5. Thus, because it may becomes easy to obtain a state where the leading end portion (upper end portion) of the side airbag 7 is disposed in the vehicular outer side from the curtain airbag 5, it may be easy to obtain a state where the movement of the curtain airbag 5 towards the vehicular outer side is suppressed by the side airbag 7.

Further, in select embodiments, the boundary portion 24 of the upper side compartment portion 22 and the second lower side compartment portion 21 may be established in the side airbag 7 with the crease (along the lower portion edge) in a position corresponding to the lower portion edge 2a of the side window area 2 in the inflated and deployed state. Thus, because the upper portion of the side airbag 7 may be bent from the crease (formed by the boundary portion 24) towards the vehicular outer side from the opening portion of the side window area 2, the vehicular inner side base cloth 18 may contact the curtain airbag 5. For this reason, it may become easy to obtain a state where the movement of the curtain airbag 5 towards the vehicular outer side may be suppressed.

In particular, the boundary portion 24 of the upper side compartment portion 22 and the second lower side compartment portion 21 may form the crease. Such a crease may be obtained by a relatively simple constitution. Particularly, the boundary portion 24 (i.e., crease) may be obtained very simply by the stitch or seam line 19c.

Further, in select embodiments, the exhaust port 27 for exhausting the gas towards the vehicular outer side may be provided in the upper portion of the side airbag 7. Thus, because the reaction force Fr of the gas exhaust may be exerted in the upper portion of the side airbag 7 towards the vehicular inner side, an excessive movement of the upper portion of the side airbag 7 towards the vehicular outer side may be suppressed and a force may be generated for pressing the curtain airbag 5, which may contact the side airbag 7, to the vehicular inner side. Accordingly, the movement of the curtain airbag 5 towards the vehicular outer side may be more securely suppressed.

Also, in select embodiments, the communication port 25 for communicating the upper side compartment portion 22 with the second lower side compartment portion 21 may be provided at the boundary portion 24 of the upper side compartment portion 22 and the second lower side compartment portion 21. The communication port 25 may be opened toward the exhaust port 27. By doing so, the gas flowing from the second lower side compartment portion 21 into the upper side compartment portion 22 may be effectively exhausted from the exhaust port 27. Thus, the effects from forming the exhaust port 27 may be more securely obtained.

Further, in select embodiments, when the side airbag 7 is inflated and deployed, the upper side compartment portion 22 may correspond to the head portion Pa of the passenger P and the second lower side compartment 21 may correspond to the chest portion Pd of the passenger P. Thus, the gas in the second lower side compartment portion 21 may be introduced via the communication port 25 into the upper side compartment portion 22 by pressing the second lower side compartment portion 21 by the chest portion Pd of the passenger P. That is, because the chest portion Pd of the passenger P may first contact the second lower side compartment portion 21 of the side airbag 7, the upper side compartment portion 22 may be inflated at a more proper time based on the timing of pressing the second lower side compartment portion 21 by the chest portion Pd. Accordingly, the protection of the head portion Pa may be improved.

While the disclosure has been presented with respect to a limited number of embodiments, those skilled in the art, having benefit of this disclosure, will appreciate that other embodiments may be devised which do not depart from the scope of the present disclosure. For example, although a side airbag may suppresses the movement of the curtain airbag towards the vehicular outer side as described above, the side airbag may also suppress the movement towards the vehicular inner side as well. Further, the specifications of the curtain airbag or side airbag such as the layouts, sizes, shapes and etc. may be properly varied. For example, the side airbag may be installed in the vehicle compartment side wall such as the door or pillar or in the floor. Accordingly, the scope of the invention should be limited only by the attached claims.

What is claimed is:

1. An airbag apparatus of a vehicle, comprising:
a curtain airbag configured to be deployed from a first location proximate to an upper portion of a side window of the vehicle;
the curtain airbag configured to extend to a lower portion of the side window when the curtain airbag is inflated; and
a side airbag configured to be deployed from a second location proximate to the lower portion of the side window and comprises a seam that forms a boundary between an upper compartment and a lower compartment of the side airbag;
wherein the seam is configured to correspond to a lower edge of the side window so that the upper compartment bends at the seam to cover the lower edge of the side window, and
wherein the side airbag is arranged to suppress a movement of a lower portion of the curtain airbag through friction with the upper compartment of the side airbag when the curtain airbag and the side airbag are inflated.

2. The airbag apparatus of claim 1, wherein the side airbag is configured to suppress a movement of the curtain airbag toward an outer side of the vehicle through contact when the side and the curtain airbags are inflated.

3. The airbag apparatus of claim 2, wherein the side airbag comprises:
a vehicular outer side base cloth and a vehicular inner side base cloth;
wherein the vehicular inner side base cloth is configured to contact the lower portion of the curtain airbag when the curtain and the side airbags are inflated.

4. The airbag apparatus of claim 3, wherein the inner side base cloth is configured to suppress the movement of the lower portion of the curtain airbag through friction.

5. The airbag apparatus of claim 1 wherein the seam comprises a communication port configured to allow a gas from an inflator to flow from the lower compartment to the upper compartment.

6. The airbag apparatus of claim 5, further comprising an exhaust port in the upper compartment to exhaust the gas from the inflator toward the outer side of the vehicle.

7. The airbag apparatus of claim 1, wherein an upper portion of the side airbag comprises an exhaust port configured to exhaust a gas from an inflator towards the vehicular outer side.

8. The airbag apparatus of claim 7, wherein the exhaust port is configured to suppress the movement of the lower portion of the curtain airbag with a force of an exhausting gas.

9. The airbag apparatus of claim 7, wherein:
the side airbag comprises a communication port to communicate between the upper compartment and the lower compartment of the side airbag, and
the communication port is opened toward the exhaust port.

10. The airbag apparatus of claim 9, wherein
when the side airbag is inflated and deployed, the upper compartment corresponds to a head portion of a passenger and the lower compartment corresponds to a chest portion of the passenger, and
a gas in the lower compartment is transferred through the communication port into the upper compartment when the lower compartment is pressed by the chest portion of the passenger.

11. A method to construct an airbag assembly of a vehicle, the method comprising:
providing a curtain airbag to an upper portion of a side of the vehicle;
providing a side airbag to a lower portion of a side of the vehicle;
arranging the side airbag such that an upper portion of the side airbag suppress movement of the curtain airbag towards an outer side of the vehicle when the side and the curtain airbags are inflated; and
separating an upper compartment of the side airbag from a lower compartment of the side airbag with a seam and a communication port,
wherein the seam is configured to correspond to a lower edge of a side window so that the upper compartment bends at the seam to cover the lower edge of the side window, and
wherein the upper portion of the side airbag is configured to suppress movement of the curtain airbag through friction.

12. The method of claim 11, wherein the lower compartment of the side airbag is configured to inflate the upper compartment of the side airbag through the communication port when a portion of a passenger presses against the lower compartment.

13. The method of claim 11, further comprising providing an exhaust port to the upper portion of the side airbag.

14. An airbag apparatus of a vehicle, comprising:

a curtain airbag configured to be deployed from a first location proximate to an upper portion of a side window of the vehicle;

the curtain airbag configured to extend to a lower portion of the side window when the curtain airbag is inflated; and a side airbag configured to be deployed from a second location proximate to the lower portion of the side window;

wherein the side airbag comprises a means for suppressing movement of the curtain airbag when the curtain airbag and the side airbag are inflated, and wherein the side airbag comprises a seam configured to correspond to a lower edge of the side window so that and upper compartment of the side airbag bends at the seam to cover the lower edge of the side window.

15. The airbag apparatus of claim 14, wherein the means for suppressing movement of the curtain airbag comprises friction between the side airbag contacting an outer side of the curtain airbag.

16. The airbag apparatus of claim 14, wherein the means for suppressing movement of the curtain airbag comprises exhausting gas from an exhaust port in an upper portion of the side airbag in a direction toward the vehicular outer side.

* * * * *